United States Patent
Foellmer (10) Patent No.: US 9,368,317 B2
(45) Date of Patent: Jun. 14, 2016

(54) BALANCING OF A ROTATING ANODE

(71) Applicant: KONINKLIJKE PHILIPS N.V., Eindhoven (NL)

(72) Inventor: Marcus Walter Foellmer, Hamburg (DE)

(73) Assignee: KONINKLIJKE PHILIPS N.V., Eindhoven (NL)

(*) Notice: Subject to any disclaimer, the term of this patent is extended or adjusted under 35 U.S.C. 154(b) by 62 days.

(21) Appl. No.: 14/362,308

(22) PCT Filed: Nov. 28, 2012

(86) PCT No.: PCT/IB2012/056791
§ 371 (c)(1),
(2) Date: Jun. 2, 2014

(87) PCT Pub. No.: WO2013/084114
PCT Pub. Date: Jun. 13, 2013

(65) Prior Publication Data
US 2014/0314208 A1 Oct. 23, 2014

Related U.S. Application Data

(60) Provisional application No. 61/567,183, filed on Dec. 6, 2011.

(51) Int. Cl.
*H01J 1/10* (2006.01)
*F16F 1/14* (2006.01)
(Continued)

(52) U.S. Cl.
CPC ........... *H01J 35/101* (2013.01); *F16F 15/1201* (2013.01); *F16F 15/264* (2013.01);
(Continued)

(58) Field of Classification Search
CPC ............. H05G 1/00; H05G 1/02; H05G 1/08; H05G 1/56; H05G 2/00; H02K 7/04; H02K 15/16; H02K 15/165; F16F 15/10; F16F 15/12; F16F 15/1201; F16F 15/14; F16F 15/26; F16F 15/264; F16F 15/28; F16F 15/32; F16F 15/36; F16F 2230/00; F16F 2230/0011; H01J 35/00; H01J 35/02; H01J 35/025; H01J 35/04; H01J 35/08; H01J 35/10; H01J 35/101; H01J 35/103; H01J 2235/08; H01J 2235/083; H01J 2235/086; H01J 2235/10; H01J 2235/1006; H01J 2235/1013; H01J 2235/1026; H01J 2235/1033; H01J 2235/104; H01J 2235/1046; H01J 2235/1093
USPC ........... 378/91, 119, 121, 125, 131, 132, 135, 378/143, 144, 193, 204, 210; 74/813 R; 464/179, 180, 185; 310/261.1, 262, 310/272, 10, 40 R, 46, 51, 66, 91, 273
See application file for complete search history.

(56) References Cited

U.S. PATENT DOCUMENTS 3,339,430 A * 9/1967 Klein .................... B24B 41/042
451/343
3,909,584 A 9/1975 Brienza et al.
(Continued)

FOREIGN PATENT DOCUMENTS

| JP | 1151142 | 6/1989 |
|---|---|---|
| JP | 2001211613 | 8/2001 |
| WO | WO2011039662 | 4/2011 |

*Primary Examiner* — Anastasia Midkiff (57) ABSTRACT

A rotating anode disk is balanced in a state where the rotating anode disk is mounted inside an X-ray tube. An adjustment device (54) balances the rotating anode disk in an operating state. The adjustment device includes at least a first plurality (72) of balancing elements (74) which are attached to at least one circular ring structure (76). The balancing elements each include a balancing portion (80) mounted to the circular ring structure via a bending portion (82). The bending portions are configured to be heated to a bending temperature to allow a radial pivoting movement (84) of the balancing portion from a first state (86) into a second state (88) caused by centrifugal forces upon rotation. A center of mass of the balancing portion is closer to a center (90) of the circular ring structure in a first state than the second state.

16 Claims, 8 Drawing Sheets

(51) Int. Cl.
*H02K 7/04* (2006.01)
*H01J 35/10* (2006.01)
*F16F 15/12* (2006.01)
*F16F 15/26* (2006.01)
*G01M 1/36* (2006.01)
*H01J 35/14* (2006.01)

(52) U.S. Cl.
CPC ............... *G01M 1/36* (2013.01); *H01J 35/10* (2013.01); *H01J 35/14* (2013.01); *H01J 2235/1093* (2013.01); *H02K 7/04* (2013.01)

(56) References Cited

U.S. PATENT DOCUMENTS

| 4,037,076 | A |   | 7/1977  | Blackaby |            |
|-----------|---|---|---------|----------|------------|
| 4,584,669 | A | * | 4/1986  | Moynihan | G11C 7/20  |
|           |   |   |         |          | 365/154    |
| 6,005,749 | A | * | 12/1999 | Ikuta    | F16F 15/363|
|           |   |   |         |          | 310/51     |
| 2005/0097724 | A1 | * | 5/2005 | Hodowanec | H02K 7/04 |
|           |   |   |         |          | 29/598     |
| 2005/0135561 | A1 |   | 6/2005 | Hebert et al. | |
| 2009/0016489 | A1 | * | 1/2009 | Danz | H01J 35/101 |
|           |   |   |         |          | 378/94     |

* cited by examiner

BALANCING OF A ROTATING ANODE

CROSS-REFERENCE TO PRIOR APPLICATIONS

This application is the U.S. National Phase application under 35 U.S.C. §371 of International Application Serial No. PCT/IB2012/056791, filed on Nov. 28, 2012, which claims the benefit of U.S. Application Ser. No. 61/567,183, filed on Dec. 6, 2011. These applications are hereby incorporated by reference herein.

FIELD OF THE INVENTION

The present invention relates to balancing of a rotating anode. The present invention in particular relates to an adjustment device for balancing a rotating anode disk in an operating state, a rotating anode structure, an X-ray tube, an X-ray imaging system, a method for balancing an anode disk rotating around an axis of rotation, as well as to a computer program element and a computer readable medium.

BACKGROUND OF THE INVENTION

In order to allow high speed rotation of a rotating anode, precise balancing of the rotating portion is needed. Thus, for example, unwanted vibration caused by an off-balance is avoided. For example, after the assembly of an anode rotating system, material is removed for balancing purposes, for example by drilling, milling or grinding. However, this requires particular attention in terms of cleaning, in order to prevent any material dust inside the vacuum housing into which the balanced anode assembly is then mounted. Further, a need for balancing, so-to-speak re-balancing, may also arise up after the rotating anode system is mounted into an X-ray tube. Since the rotating parts are enclosed in vacuum tight tube frames, no further balancing is possible. WO 2011/039662 A1 describes balancing of the rotary anode of an X-ray tube in which the anode comprises one or more balancing cavities partly filled with balancing material being solid at a operating temperature of the X-ray tube and liquid at a higher temperature to adjust the centre of gravity of the anode even in tubes which have already been used and where the imbalance, for example, is a result of such use. However, it has been shown that the steps of heating up the balancing material, dislocating the balancing material such that imbalance of the anode is compensated, and the cooling of the balancing material requires relatively complex measurements.

SUMMARY OF THE INVENTION

There may be a need to provide a facilitated balancing of a rotating anode allowing balancing also in a state where the rotating anode disk is mounted inside an X-ray tube.

The object of the present invention is solved by the subject-matter of the independent claims, wherein further embodiments are incorporated in the dependent claims.

It should be noted that the following described aspects of the invention apply also for the adjustment device, the rotating anode structure, the X-ray tube, the X-ray imaging system, the method for balancing an anode disk rotating around an axis of rotation, as well as for the computer program element and the computer readable medium.

According to a first aspect of the present invention, an adjustment device for balancing a rotating anode disk in an operating state is provided. The adjustments device comprises at least a first plurality of balancing elements, which are attached to at least one circular ring structure. The balancing elements each comprise a balancing portion mounted to the circular ring structure via a bending portion. The latter are configured to be heated to a bending temperature to allow radial pivoting movement of the balancing portion from a first state into a second state caused by centrifugal forces upon rotation. In the first state, a centre of mass of the balancing portion is closer to a centre of the circular ring structure than in the second state.

According to an exemplary embodiment, in the first state, the balancing elements are arranged parallel to an axis of the circular ring structure, wherein in the second state the balancing elements are arranged perpendicular to the axis.

According to a further exemplary embodiment, the bending portions are configured to be heatable by an electron beam.

According to a second aspect of the present invention, a rotating anode structure is provided, comprising an anode disk with an anode body and an adjustment device according to one of the above described examples for balancing the anode structure. The balancing elements are attached to an outer edge of the anode disk.

According to an exemplary embodiment, a second circular ring structure with a second plurality of balancing elements is provided. The second circular ring structure is arranged such that the second plurality of balancing elements, when being in the second state, are actually displaced in relation to the first plurality of balancing elements, when being in the second state.

According to a third aspect of the present invention, an X-ray tube is provided, comprising a cathode, a rotating anode and electron beam deflection means. The cathode is configured to emit electrons as an electron beam towards the anode. The rotating anode is provided as a rotating anode structure according to one of the above described examples. The electron beam deflection means are configured to deflect the beam such that a determined bending portion of a determined balancing element is heated by the electron beam to the bending temperature to allow radial bending of the bending portions towards the second state.

According to an exemplary embodiment, the cathode and the rotating anode with the balancing elements are provided inside a sealed tube housing in an operating state for X-ray generation. The balancing possibility is provided in the operating state.

According to a further exemplary embodiment, a balancing detection device is provided at least temporarily to detect off-balance of the rotating anode and to provide a signal to the control unit identifying at least one of the balancing elements to be bended for balancing the anode.

According to a fourth aspect of the present invention, an X-ray imaging system is provided, comprising an X-ray source, and an X-ray detector. The X-ray source is provided as an X-ray tube according to the above mentioned examples.

According to a fifth aspect of the present invention, a method for balancing an anode disk rotating around an axis of rotation is provided, comprising the following steps:
a) detecting off-balance of a rotating anode structure;
b) determining at least one balancing element of at least a first plurality of balancing elements, wherein the determined balancing element comprises a balancing portion attached to the anode structure via a bending portion, and which bending portions are configured to allow a radial pivoting movement of the balancing portion from a first state into a second state caused by centrifugal forces upon rotation, wherein in the first state, a centre of mass of the balancing portion is closer to the rotating axis of the anode disk than in the second state;

c) emitting an electron beam towards the bending portion, thereby heating the bending portion to a bending temperature to allow the radial pivoting movement; and d) rotating the anode structure generating centrifugal forces acting on the balancing portion and thereby causing the radial pivoting movement of the balancing portion.

According to a further aspect of the present invention, a balancing of a rotating anode is provided by arranging an additional structure inside the vacuum of an X-ray tube, which additional structure comprises a number of portions that can be displaced spatially in order to achieve different momentum effects during the rotation. Thus, imbalance of an anode disk, for example, can be compensated. Since the balancing portions are displaced in relation to anode disk structure, while being attached to the anode, or at least in mechanical connection, no material machining is necessary, thus avoiding the risk of unwanted material leftovers after the balancing procedure. Further, the balancing can also be provided when the anode disk is already mounted inside a vacuum housing, or other sealingly enclosing structure. To activate the so-to-speak displacement, achieved by bending the balancing portions, heat is transmitted to the bending portions to provide a degree of softness of the material necessary to allow a bending caused by centrifugal forces. The latter forces are provided by rotating the anode structure to a respectively necessary speed of rotation. Of course, a relation between the degree of softness and the speed of rotation exists. In other words, two parameters are provided for controlling the deformation or displacement process. Since both activation forces, namely the transmission of heat to the bending portion and forces acting on the balancing portions in form of the centrifugal forces, can act on the adjustment device from outside to the inside of a tube housing, an in-vivo balancing for a rotating X-ray anode is provided. Further, by providing the heating of the bending portions by the means of an electron beam, no further additional equipment except for the detection of the off-balance is needed. Thus, a facilitated way of balancing a rotating anode disk is provided.

These and other aspects of the present invention will become apparent from and be elucidated with reference to the embodiments described hereinafter.

BRIEF DESCRIPTION OF THE DRAWINGS

Exemplary embodiments of the invention will be described in the following with reference to the following drawings.

DETAILED DESCRIPTION OF EMBODIMENTS

Figure 1:
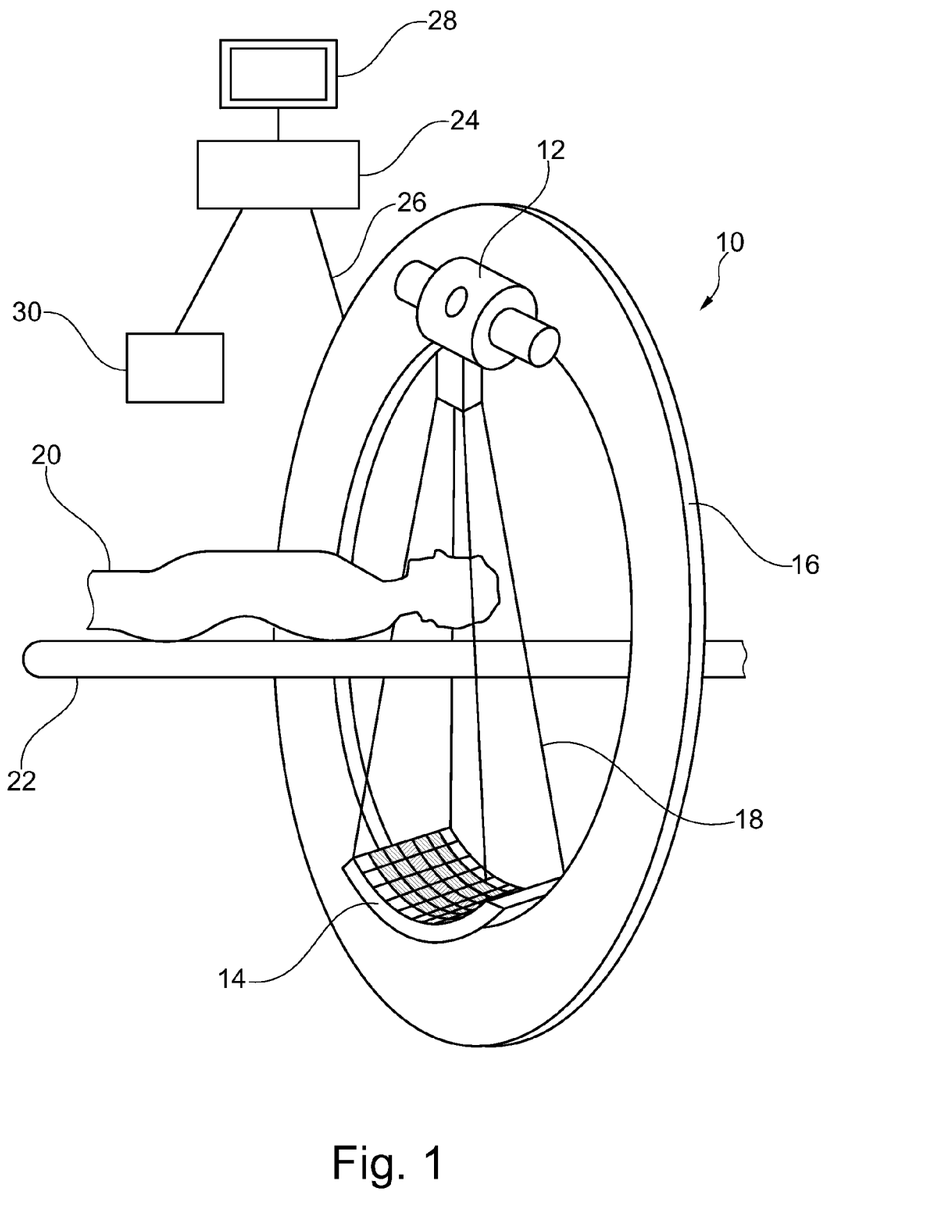
FIG. 1 describes an X-ray imaging system according to an exemplary embodiment of the present invention in form of a CT X-ray imaging system.

FIG. 1 schematically shows an X-ray imaging system 10 comprising an X-ray source 12 and an X-ray detector 14. The X-ray source 12 and the X-ray detector 14 are provided on a gantry 16 opposing each other. The X-ray source and the X-ray detector can be rotated on the circular gantry 16 in order to acquire X-ray images with an X-ray beam 18 of an object 20, for example a patient, from different directions. The patient 20, for example, may be arranged on a patient support 22. Further, a control unit 24 is provided, schematically connected to the gantry 16 and the X-ray source 12 and the detector 14 by a connecting line 26. Further, a display unit 28 is provided, as well as an interface 30, for example for entering commands to operate the X-ray imaging system 10.

It must be noted that although FIG. 1 shows a CT type X-ray imaging system 10, also other X-ray imaging systems are provided, in which an X-ray tube is provided for the X-ray source 12, which X-ray tube encloses a rotating anode disk.

The X-ray source 12 is provided as an X-ray tube according to one the below described examples.

Figure 2:
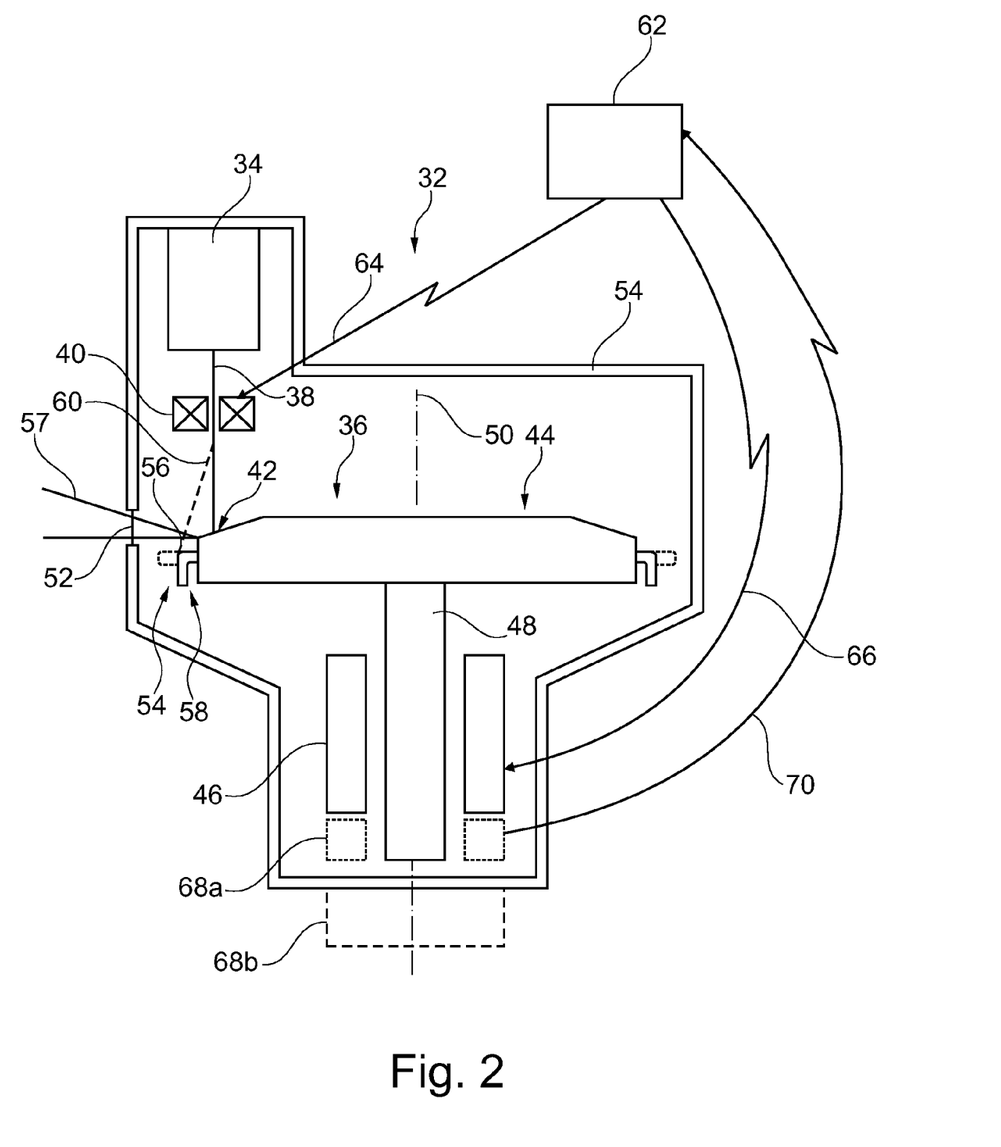
FIG. 2 shows a schematic cross-section through an X-ray tube according to an exemplary embodiment of the present invention.

FIG. 2 shows a cross-section through an X-ray tube 32 comprising a cathode 34 and a rotating anode 36. The cathode 34 is configured to emit electrons as an electron beam 38 towards the anode. Further, electron beam deflection means 40 are provided, for example, for focusing the electron beam 38 to a focal track 42 on an anode disk 44.

Further, drive actuation and bearing means 46 are schematically indicated in relation with an anode shaft 48 supporting the anode disk 44. The anode disk 44 can thus rotate around an axis of rotation 50.

Upon electrons impinging the focal track 42, X-ray radiation is generated, leaving an X-ray window 52 of an X-ray tube housing 54, also referred to as vacuum housing, generating an X-ray beam 57. Further, an adjustment device 54 according to the present invention is provided, which adjustment device 54 will be described in more detail in relation with the following figures. According to the present invention, the electron beam deflection means 40 are configured to deflect the beam 38 such that a determined bending portion 56 of a determined balancing element 58 is heated by the electron beam to a bending temperature to allow radial bending of the balancing portion, which will also be described in more detail in the following figures. In FIG. 2, a deflected electron beam 60 is indicated with a dotted line.

According to an exemplary embodiment, as shown in FIG. 2, the cathode 34 and rotating anode 36 with the balancing elements 58 are provided inside the sealed tube housing 54 in an operating state for X-ray generation. The balancing possibility is provided in the operating state, for example.

However, it is noted that the balancing of the rotating anode can also be provided in a pre-operation state, i.e. in a state during assembly.

According to a further example, nevertheless also shown in FIG. 2, but not meaning a necessity for the above described features, a control unit 62 is provided, configured to control the electron beam deflection means, indicated by a symbolic connection line 64, to deflect an electron beam emitted from the cathode towards the anode such that it hits a bending portion of a determined balancing element of the plurality of balancing elements and thereby heats the bending portion to a bending temperature.

The control unit is further configured to activate the rotating means 46, indicated with a further communication or connection line 66, to rotate the anode to cause the radial pivoting movement of the balancing portion in direction of a balancing position due to centrifugal forces.

According to a further example, also shown in relation with FIG. 2, although also not meaning a necessity for the above described different embodiments, a balancing detection device 68 is provided at least temporarily to detect off-balance of the rotating anode and to provide a signal 70 to the control unit 62 identifying at least one of the balancing elements to be bended for balancing the anode. For example, the balancing detection device may be provided inside the vacuum housing 54 constantly, as indicated by dotted frame structures 68A. The balancing detection device may also be provided constantly outside the tube housing, as indicated with dotted frame structure 68B. For example, the balancing detection device 68B arranged outside the housing can be provided temporarily for a detection of the off-balance, for example for maintenance intervals. The balancing detection device 68A inside the tube housing may be provided for a constant control of the balancing, or for maintenance purposes only, too. For example, a control loop may be provided by connecting the balancing detection device with the control unit at least for a duration of the balancing procedure.

In the following, the above mentioned adjustment device 54 shall be described in relation with FIG. 3. The adjustment device 54 for balancing a rotating anode disk in an operating state comprises a first plurality 72 of balancing elements 74, which are attached to at least one circular ring structure 76.

One of the balancing elements 74 is shown in an upwardly bended state, identified with reference numeral 78.

The balancing elements 74 each comprise a balancing portion 80 mounted to the circular ring structure 76 via a bending portion 82. The bending portions are configured to be heated to a bending temperature to allow a radial pivoting movement, indicated with an arrow 84, of the balancing portion 80 from a first state 86, shown for the other balancing elements, into a second state 88, shown, for example, in FIG. 8C, caused by centrifugal forces upon rotation. In the first state 86, a centre of mass of the balancing portion is closer to a centre of rotation, for example an axis of rotation 90 of the circular ring structure 76, than in the second state 88. However, the state shown for the exemplary balancing element 78 may also be referred to as second state. In the bending temperature, the bending portions are plastically deformable.

In the following, some further features of the adjustment device 54 are described in relation with a rotating anode structure 92, shown in FIGS. 4 and 5.

Figure 4:
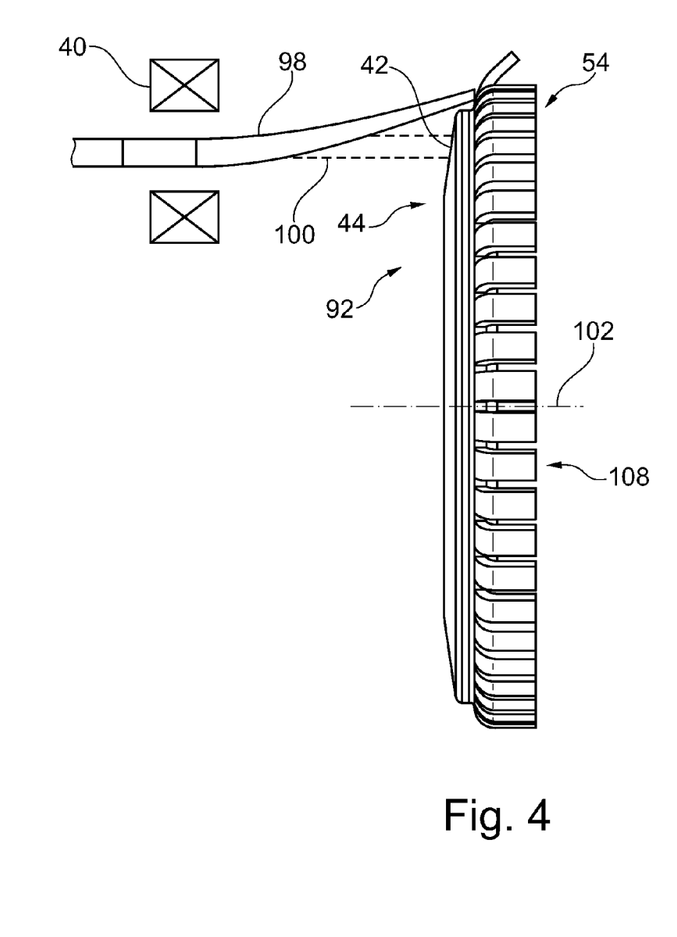
FIG. 4 shows a rotating anode structure according to an exemplary embodiment of the present invention.
Figure 5:
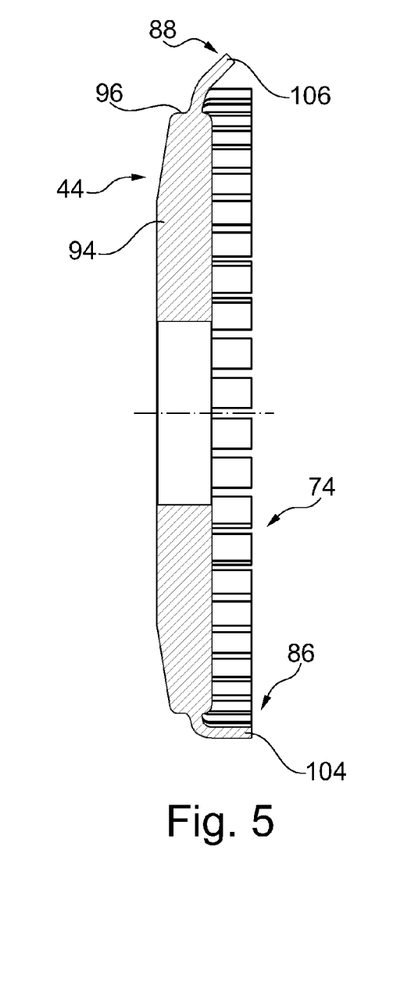
FIG. 5 shows a cross-section through the rotating anode structure of FIG. 4.

FIG. 4 shows a side view of the rotating anode structure 92, comprising the above mentioned anode disk 44 with an anode body 94, shown in FIG. 5 in a cross-section. Further, the adjustment device 54 is also provided. The balancing elements are attached to an outer edge 96 of the anode disk 44. For example, the outer edge 96 is the circumferential front face of the anode disk body 94.

Further, an electron beam 98 deflected by the above mentioned electron beam deflection means 40 is indicated for explanational purposes only. An electron beam 100 hitting the focal track 42 on the anode disk 44 is indicated with dotted lines. Further, an axis of rotation 102 of the anode disk is indicated.

In FIG. 5, the cross-section shows one of the balancing elements 74 in the first state 86 as the lower balancing element in FIG. 5. This element is indicated with reference numeral 104. The respective upper balancing element, shown in an upwardly bended state, for example the second state 88, is indicated with reference numeral 106.

Figure 3:
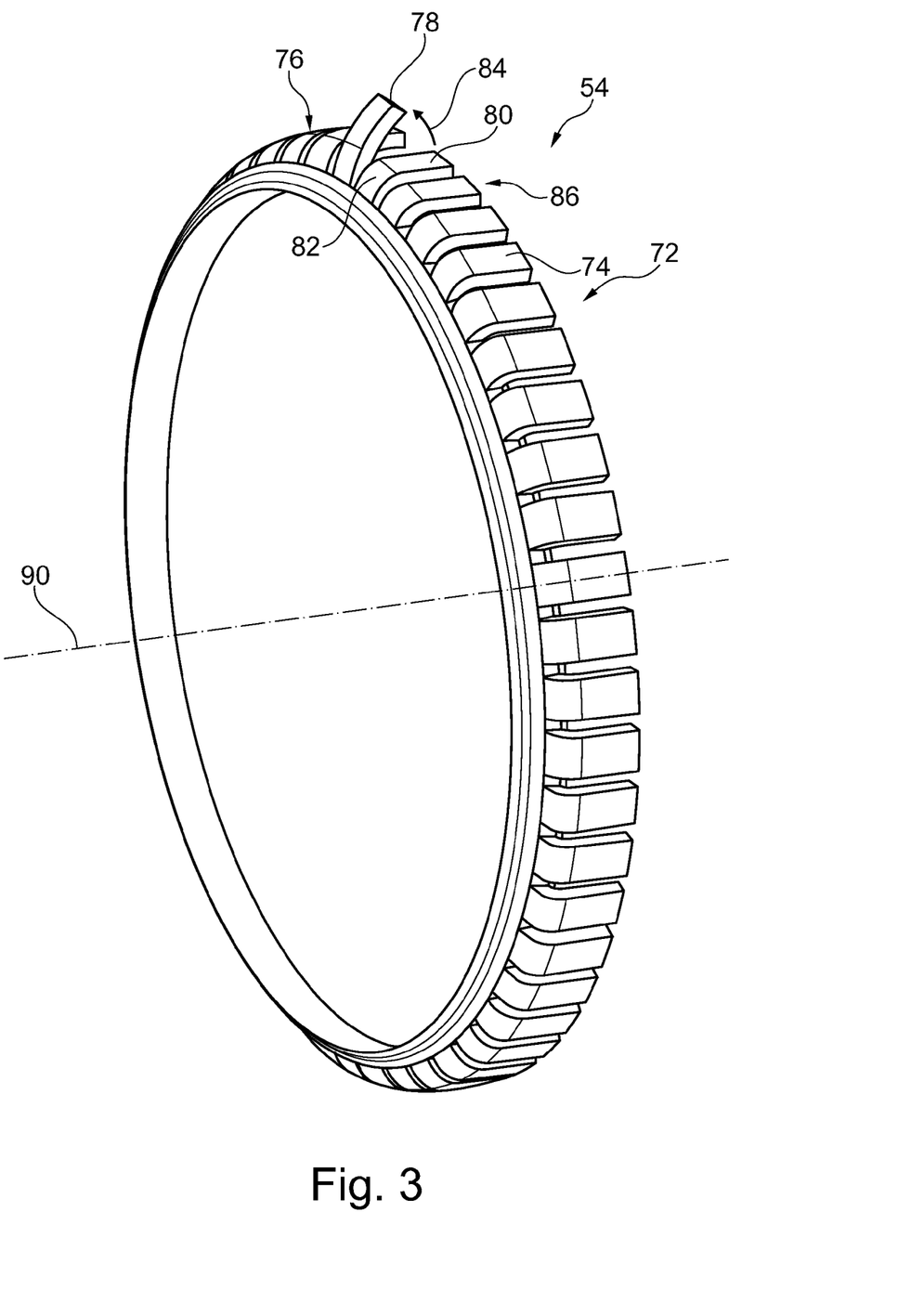
FIG. 3 shows an exemplary embodiment of an adjustment device for balancing a rotating anode disk according to an exemplary embodiment of the present invention.

As can be seen, in the first state 86, the balancing elements are arranged parallel to the axis of rotation 102, for example equal to the axis 90 of the circular ring structure 76 shown in FIG. 3. In the second state 88, the balancing elements are arranged perpendicular or at least inclined to the axis 90.

However, the first state may be provided as a different spatial state, for example, bent further down, i.e. with the centre of mass located closer to the axis of rotation. Also the second state may be provided as a different spatial state, for example, not completely bent upwards.

The bending portions with the balancing portions, i.e. the balancing elements, are provided as adjacent linear finger elements, as indicated with reference numeral 108 in FIG. 4.

Figure 6A:
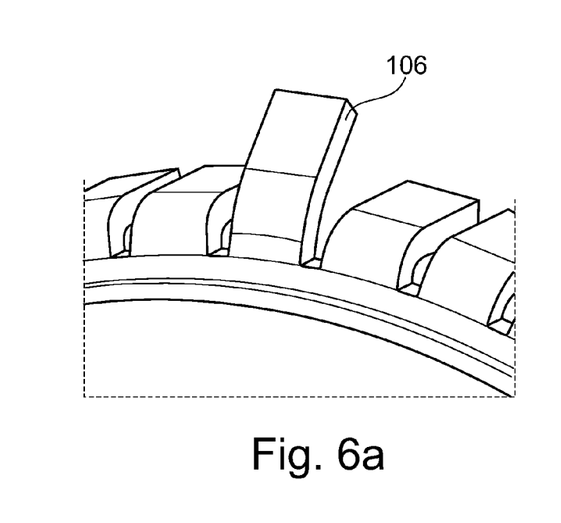
FIGS. 6A to 6B show a detailed section of the adjustment device of FIG. 3 in two different states.
Figure 6B:
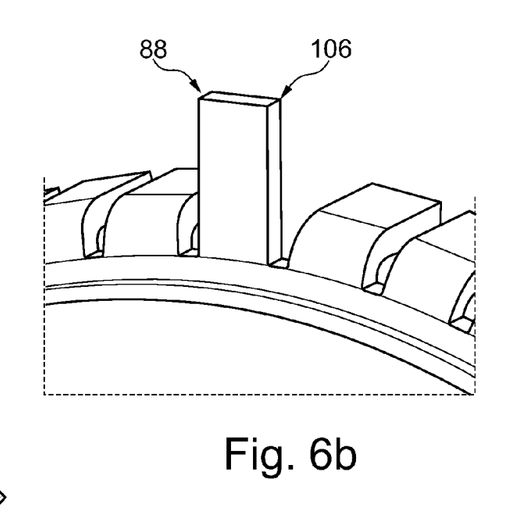

FIG. 6A shows a perspective view of the upwardly bended balancing element 106. Below, FIG. 6B shows the balancing element 106 in the second state 88, wherein the balancing element is arranged axially.

Figure 7:
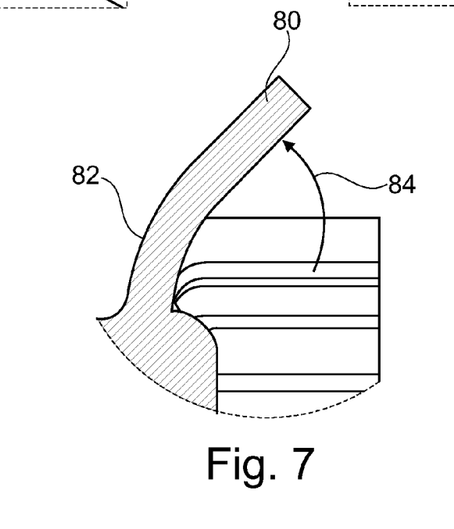
FIG. 7 shows a cross-section through the adjustment device of FIG. 6A.

FIG. 7 schematically illustrates the radial pivoting movement 84 of the balancing portion 80, caused by centrifugal forces and being effective once the bending portion 82 is heated up by the electron beam 98, thus providing the bending portions to be plastically deformable. In other words, once the bending portions allow an easier bending, for which centrifugal loads upon rotation of the circular ring structure 76 are sufficient, this causes a displacement of the balancing portion 80 in relation to the other rotating parts, thus resulting in the occurrence of a momentum upon rotation of the structure.

Figure 8A:
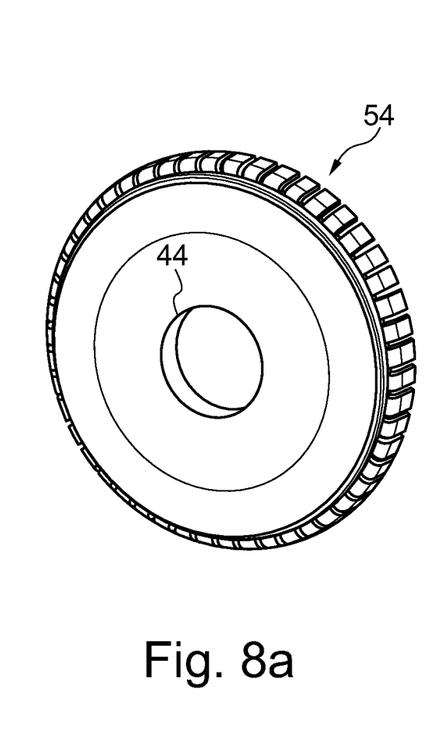
FIGS. 8A to 8C show three different states of a balancing element according to an exemplary embodiment of the present invention.
Figure 8B:
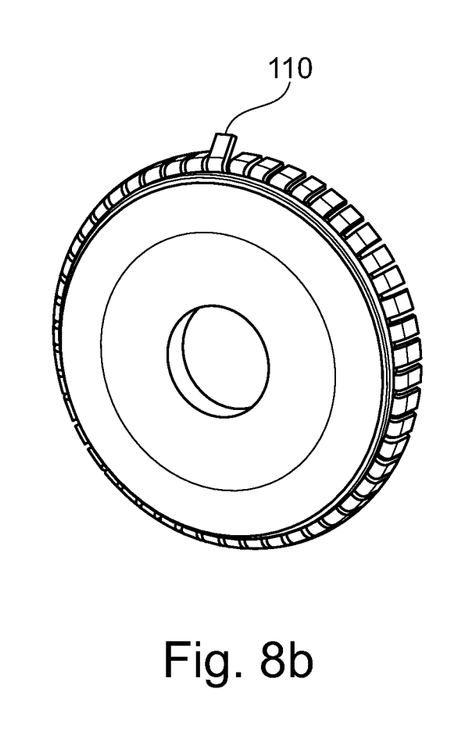
Figure 8C:
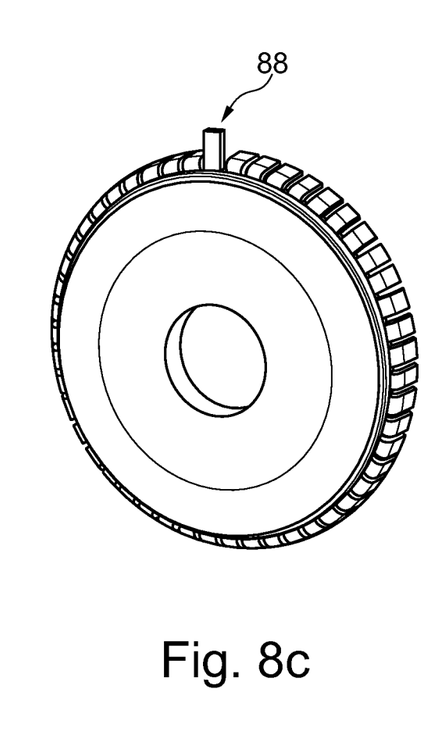

FIG. 8A shows a perspective view of the adjustment device 54 in relation with the rotating anode disk 44 in the first state 86, where none of the balancing elements has been bended into the direction of the second state, as shown in FIG. 8B for an intermediate bending state 110, and in FIG. 8C for the second state 88.

The circular ring structure 76 may be provided as attached to the outer edge of the anode disk 44, or may be provided as a one-part structure shown in FIG. 5 in the cross-section, where the anode disk 44, or the anode body 94 respectively, provides the circular ring structure 76, and where the balancing elements 74 are attached to the outer edge 96 of the anode disk.

Figure 9:
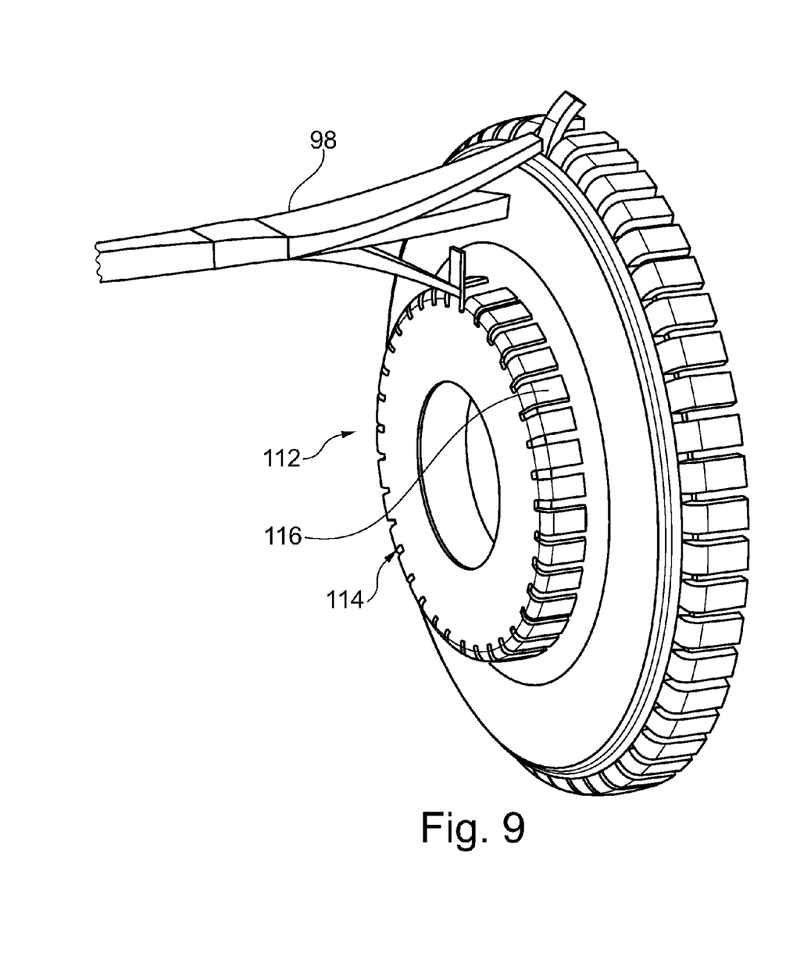
FIG. 9 shows a further example of a rotating anode structure.
Figure 10:
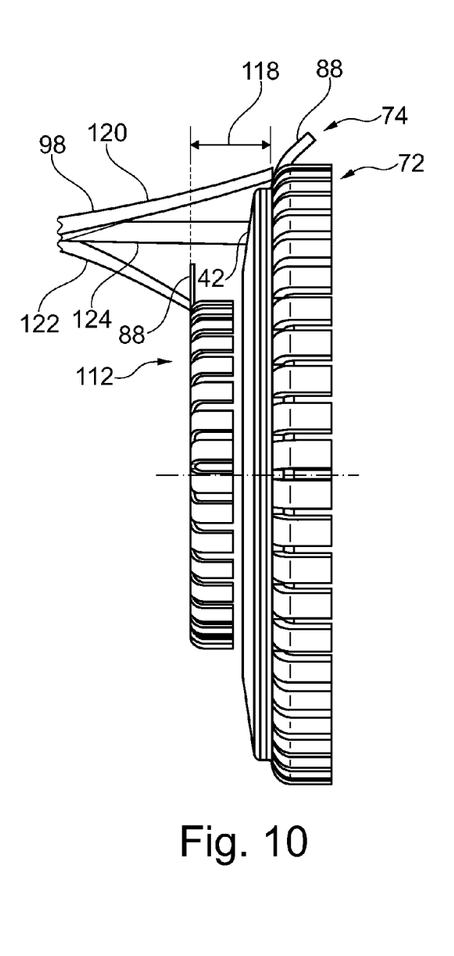
FIG. 10 shows a further view of the rotating anode structure of FIG. 9.

FIG. 9 shows a perspective view of a further exemplary embodiment, wherein a second circular ring structure 112 with a second plurality 114 of balancing elements 116 is provided. The second circular ring structure is arranged such that the second plurality 114 of balancing elements 116, when being in the second state, are actually displaced in relation to the first plurality 72 of balancing elements 74, when being in the second state 88. For example, FIG. 10 showing a side view of the rotating anode structure of FIG. 9, shows a balancing element 74 in an upright position, i.e. the second state 88, and the first plurality having a balancing element 74 in a bended-up state, also referred to as the second state. However, a displacement is indicated with arrow 118.

The electron beam 98 of FIG. 4 is also shown for a case where the electron beam hits the first balancing element, and also for a state in which a bending portion of one of the second balancing portions on the second circular ring structure 112 is being heated up by the electron beam. Thus, the electron beam is shown with a first branch 120 for heating the balancing elements of the first plurality 72, and with a second branch 122 heating the balancing elements of the second plurality 112. Further, a third branch 124 indicates the electron beam hitting the focal track 42 in an operating state.

The third branch electron beam 124 is also referred to as nominal focus of the electron beam. The first branch electron beam 120 is also referred to as the deflected outside electron beam, and the second branch electron beam 122 as the deflected inside electron beam, for balancing. The three branches are provided at different points in time.

However, it is also provided to deflect the beam into two branches for simultaneously heating up bending portions o the inner ring structure and bending portions of the outer ring structure.

According to a further example, the second plurality of balancing elements, at least while in the second state, is arranged in a second plane of rotation displaced to a first plane of rotation of the first plurality of balancing elements. This can be seen from FIG. 10, although not further indicated.

The displacement thus provides balancing in two planes.

The second circular ring structure is actually displaced in relation to the first circular ring, also when the balancing elements are in the first state.

According to a further example (not shown), the balancing elements of the second plurality 114 each comprise bending portions which operate on lower bending temperature than the first balancing elements.

The examples shown in FIGS. 9 and 10 describe the balancing portions, or balancing fingers, pointing in the same direction parallel to the axis of rotation. However, it is also possible to provide the second plurality 114 with balancing portions pointing in the opposite directions than the balancing portions of the first plurality. Thus, it is possible to arrange the first and second plurality in a concentrically manner when the balancing portions are in the first state. Upon upward bending, or unfolding so-to-speak, the effective centre of rotation of the respective first or second plurality is slightly shifted, thus also allowing a balancing in two planes.

Figure 11:
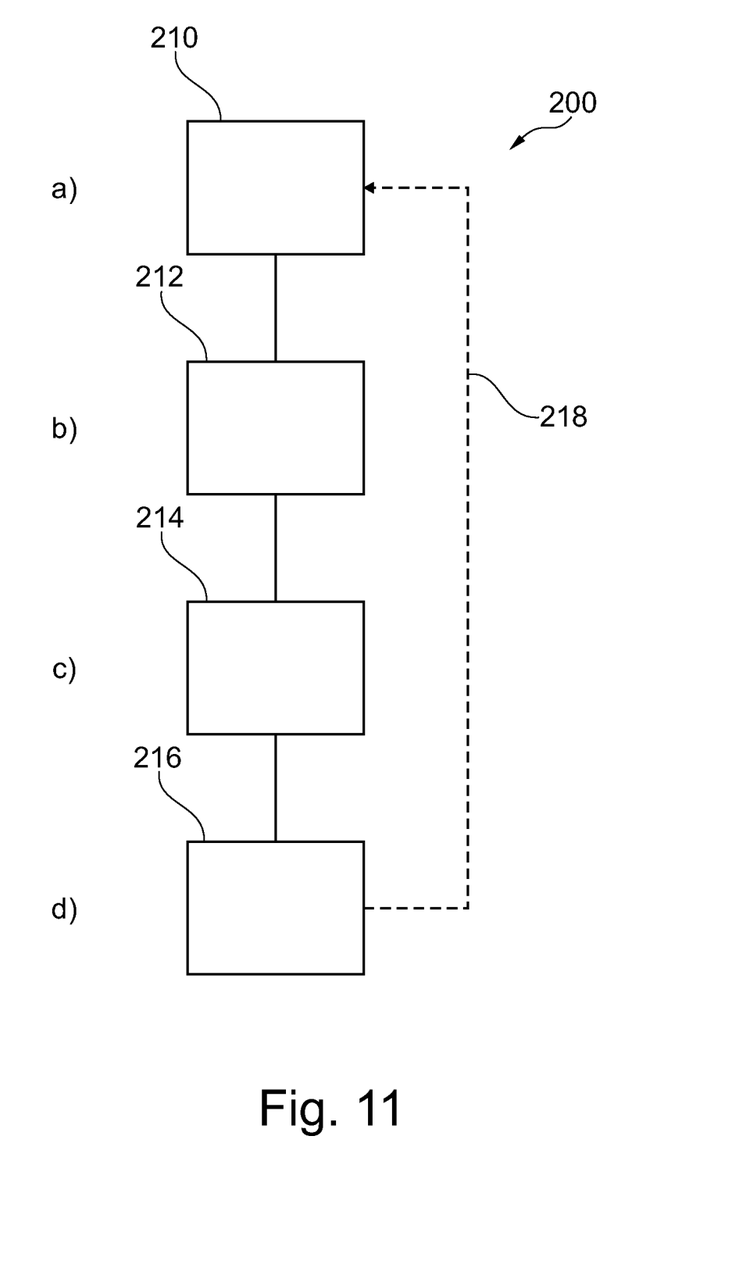
FIG. 11 shows basic steps of a method for balancing and anode disk rotating around an axis of rotation according to an exemplary embodiment of the present invention.

FIG. 11 shows a method 200 for balancing an anode disk rotating around an axis of rotation, comprising the following steps. In a first step 210, off-balance of a rotating anode structure is detected. In a second step 212, at least one balancing element of at least a first plurality of balancing elements is determined. The determined balancing element comprises a balancing portion attached to the anode structure via a bending portion. The bending portions are configured to allow a radial pivoting movement of the balancing portion from a first state into a second state caused by centrifugal forces upon rotation, wherein in the first state, a centre of mass of the balancing portion is closer to the rotating axis of the anode disk than in the second state. In a third step 214, an electron beam is emitted towards the bending portion, thereby heating the bending portion to a bending temperature to allow the radial pivoting movement. In a fourth step 216, the anode structure is rotated generating centrifugal forces acting on the balancing portion and thereby causing the radial pivoting movement of the balancing portion.

For example, the balancing is accomplished while the anode disk is mounted inside a sealed X-ray tube.

The first step 210 is also referred to as step a), the second step 212 as step b), the third step 214 as step c) and the fourth step 216 as step d).

For example, step d) is performed simultaneously to step c).

According to a further example, indicated as an option in FIG. 11, a control loop 218 is provided to start the detection 210 upon the rotating 216 and the thus achieved balancing in step d). However, this is only an option and not a necessity.

For example, pulsed deflection is provided for deflecting of the electron beam. The emission of the electron beam may also be controlled or switched by grid control.

According to an example, the off-balance is detectable in vivo. In other words, the present invention allows the detection, and also the balancing, of an X-ray tube already being used. Thus, no dismounting, or even opening of the vacuum housing is necessary.

According to a further example, the procedure can be executed with online acceleration measurement, for example, and allows a stepless and continues balancing in a very accurate manner. The balancing can be repeated until most of the balancing elements are reflexed, i.e. in the second state being in their maximum of radial extension, thus providing the maximum effect on the balancing.

The balancing elements may be provided as radial sections of a ring, bent actually to a cylinder, where the bent area may be heated by electron beam to a point where plastic bending under centrifugal load by anode rotation occurs. Thus, the outer part of the element moves outwards radially resulting in a shift of mass.

The balancing elements can be part of the ring or even be machined by milling or Electrical Discharge Machining (EDM) in the anode target structure.

Providing an inner ring with balancing elements, operating on lower temperature level than outer elements, offers a wider range of material choice, but would need more radial electron beam deflection and has less balancing effect.

For example, the balancing elements outside the focal track operate on a temperature level close to focal track and would need additional radial space, however only to a minimum amount.

The material choice is determined by temperature dependence strength, heating by electron beam should cause deformation, and under normal tube operation, the element has to be stable. Possible material for the element ring may be provided as Mo, W, Ta, Nb, or steel.

It must be noted that in FIGS. 4 to 10, features relating to the adjustment device itself have been described in relation with features of the rotating anode structure. Further, also some features relating to the X-ray tube have been described. However, it is explicitly noted that the features relating to the adjustment device are also provided separately from those features of the rotating anode structure or the X-ray tube. Similar is the case for the rotating anode structure, for which the described features are also provided separately from the features of the X-ray tube, where applicable.

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an update turns an existing program into a program that uses the invention.

Further on, the computer program element might be able to provide all necessary steps to fulfil the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. An adjustment device for balancing a rotating anode disk in an operating state, the adjustment device comprising:
   at least a first plurality of balancing elements;
   wherein the balancing elements are attached to at least one circular ring structure;
   wherein the balancing elements each comprise a balancing portion mounted to the circular ring structure via a bending portion;
   wherein the bending portions are configured to be heated to a bending temperature to allow a radial pivoting movement of the balancing portion from a first state into a second state caused by centrifugal forces upon rotation of the anode; and
   wherein in the first state, a center of mass of the balancing portion is closer to a center of the circular ring structure in the first state than the second state.

2. The adjustment device according to claim 1, wherein, in the first state, the balancing elements are arranged parallel to an axis of the circular ring structure; and
   wherein, in the second state, the balancing elements are arranged perpendicular to the axis.

3. The adjustment device according to claim 1, wherein the bending portions are configured to be heatable by an electron beam.

4. The adjustment device according to claim 1, wherein the balancing elements are radial sections of a ring bent axially to a cylinder in the first state.

5. A rotating anode structure, comprising:
   an anode disk with an anode body; and
   an adjustment device according to claim 1 for balancing the anode structure;
   wherein the balancing elements are attached to an outer edge of the anode disk.

6. The rotating anode structure according to claim 5, wherein a second circular ring structure with a second plurality of balancing elements is provided, wherein the second plurality of balancing elements have bending portions configured to pivot from the first state to the second state in the same manner as the first plurality of balancing elements;
   wherein the second circular ring structure is arranged such that the second plurality of balancing elements, when being in the second state, are axially displaced in relation to the first plurality of balancing elements, when being in the second state.

7. The rotating anode structure according to claim 5, wherein the balancing elements are formed integrally with the anode disk body.

8. An X-ray tube, comprising:
   a cathode;
   a rotating anode; and
   electron beam deflection means;
   wherein the cathode is configured to emit electrons in the form of an electron beam towards the anode;
   wherein the rotating anode is provided as a rotating anode structure according to claim 5; and
   wherein the electron beam deflection means is configured to deflect the beam such that a determined bending portion of a determined balancing element is heated by the electron beam to the bending temperature to allow radial bending of the balancing portion towards the second state.

9. The X-ray tube according to claim 8, wherein the cathode and the rotating anode with the balancing elements are provided inside a sealed tube housing in an operation state for X-ray generation; and
   wherein balancing is provided in the operating state.

10. The X-ray tube according to claim 8, wherein a control unit is provided;
    wherein the control unit is configured to control the electron beam deflection means to deflect an electron beam emitted from the cathode towards the anode such that it hits a bending portion of a determined balancing element of the plurality of balancing elements and thereby heats the bending portion to a bending temperature; and wherein the control unit is configured to activate rotating means to rotate the anode to cause the radial pivoting movement of the balancing portion in direction of the second state due to centrifugal forces.

11. The X-ray tube according to claim 8, wherein a balancing detection device is provided at least temporarily to detect off-balance of the rotating anode and to provide a signal to the control unit identifying at least one of the balancing elements to be bended for balancing the anode.

12. An X-ray imaging system, comprising:
   an X-ray source;
   an X-ray detector;
   wherein the X-ray source is provided as an X-ray tube according to claim 8.

13. A method for balancing an anode disk rotating around an axis of rotation, comprising the following steps:
   a) detecting an off-balance condition of a rotating anode structure;
   b) determining at least one balancing element of at least a first plurality of balancing elements;
   wherein the determined balancing element comprises a balancing portion attached to the anode structure via a bending portion, and which bending portion is configured to allow a radial pivoting movement of the balancing portion from a first state into a second state caused by centrifugal forces upon rotation, wherein a center of mass of the balancing portion is closer to the rotating axis of the anode disk in the first state than in the second state;
   c) emitting an electron beam towards the bending portion, thereby heating the bending portion to a bending temperature to allow the radial pivoting movement; and
   d) rotating the anode structure generating centrifugal forces acting on the balancing portion and thereby causing the radial pivoting movement of the balancing portion.

14. A non-transitory computer-readable medium having a computer program element stored thereon, wherein said computer program element, when executed by a computer, forms a control unit of the adjustment device according to claim 1.

15. A non-transitory computer-readable medium having computer program element stored thereon, wherein said computer program element, when executed by a computer, forms a control unit of the X-ray tube according to claim 8.

16. An X-ray tube comprising:
   a cathode configured to emit electrons;
   a rotating anode disk having a focal track;
   an electron beam deflection coil configured to focus the electrons into an electron beam and onto the focal track of the rotating anode disk;
   an adjustment device for balancing the rotating anode disk in an operating state, the adjustment device comprising:
      at least a first plurality of balancing elements attached to an outer edge of the anode disk, the balancing elements each including a balancing portion mounted to a circular ring structure via a bending portion,
      wherein the bending portions are configured to be heated to a bending temperature to allow a radial pivoting movement of the balancing portion from a first state into a second state caused by centrifugal forces upon rotating of the anode disk; and
      wherein in the first state, a center of mass of the balancing portion is closer to a center of the circular ring structure in the first state than the second state; and
   wherein the deflection coil is configured to deflect the electron beam under control of a control computer such that at least a determined one bending portions of at least a determined one of the balancing elements is heated by the electron beam to the bending temperature to allow radial pivoting of the at least one determined balancing portion towards the second state.

* * * * *